United States Patent
Ito et al.

(10) Patent No.: US 6,296,472 B1
(45) Date of Patent: *Oct. 2, 2001

(54) INJECTION MOLDING MACHINE

(75) Inventors: Susumu Ito, Hino; Masahiko Urata; Nobuto Matsuo, both of Oshino-mura, all of (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,104

(22) PCT Filed: Sep. 22, 1997

(86) PCT No.: PCT/JP97/03361

§ 371 Date: May 20, 1998

§ 102(e) Date: May 20, 1998

(87) PCT Pub. No.: WO98/12037

PCT Pub. Date: Mar. 26, 1998

(30) Foreign Application Priority Data

Sep. 20, 1996 (JP) ................................................ 8-269127

(51) Int. Cl.$^7$ ................................................ B29C 45/00
(52) U.S. Cl. ............................ 425/542; 425/556; 425/589
(58) Field of Search ............................. 425/556, 589, 425/542

(56) References Cited

FOREIGN PATENT DOCUMENTS

| | | |
|---|---|---|
| 61098522 | 5/1986 | (JP) . |
| 61102226 | 5/1986 | (JP) . |
| 63-303715 | 12/1988 | (JP) . |
| 2-24519 | 7/1990 | (JP) . |
| 2-34306 | 8/1990 | (JP) . |
| 05024073 | 2/1993 | (JP) . |
| 05220750 | 8/1993 | (JP) . |
| 5-285998 | 11/1993 | (JP) . |
| 6-53117 | 7/1994 | (JP) . |
| 6-53119 | 7/1994 | (JP) . |
| 08025433 | 1/1996 | (JP) . |
| 08224759 | 9/1996 | (JP) . |

*Primary Examiner*—Tim Heitbrink
(74) *Attorney, Agent, or Firm*—Staas & Halsey LLP

(57) ABSTRACT

An injection molding machine capable of easily moving a body of the injection molding machine and its associated peripheral equipments, and eliminating daily correction of the position of the peripheral equipments. A rest (5) having a peripheral-equipment mounting plate (13) is fixed to the body (1) of the injection molding machine, and a robot (17) and a peripheral equipment (18) cooperating with the injection molding machine body (1) are mounted on the plate (13). In moving the injection molding machine body (1) to another location, the robot (17) and the peripheral equipment (18) can be transported together with the injection molding machine body (1). Thus, detachment of the peripheral equipments from the injection molding machine and re-connection of cables and piping become unnecessary, and also the relative positioning does not displaced.

23 Claims, 1 Drawing Sheet

INJECTION MOLDING MACHINE

TECHNICAL FIELD

The present invention relates to an improvement in an injection molding machine.

BACKGROUND ART

In order to smoothly carry out an injection molding operation, it is necessary to use peripheral equipment associated with an injection molding machine, for example, a robot for taking out products, devices cooperating with the robot, such as a stocker, an insert feeder, a part feeder, a gate cutter, a static electricity eliminator or a product inspection machine, a temperature controller for a mold, etc., in combination with a body of the injection molding machine.

Conventionally, such peripheral equipment is disposed independently on the floor of a factory etc. separately from the body of the injection molding machine. In order to perform a series of injection molding operations by cooperation of the injection molding machine and the peripheral equipment, it is necessary to connect cables for exchanging electrical signals between a controller of the injection molding machine and the peripheral equipment; and hoses or the like for conveying coolant for a temperature controller etc.

In the event of moving the injection molding machine to another location, therefore, the body of the injection molding machine and the peripheral equipment need to be separately transported with cables, hoses, etc. detached, and after the transportation is finished, the peripheral equipment must be set up again, thus requiring much labor.

Further, for equipment which operates physically and directly on the body of the injection molding machine and the mold, such as the robot for taking out products, the position of the peripheral equipment relative to the body of the injection molding machine must always be kept in a proper relationship in view of precision of the operation. The stocker, the insert feeder, the part feeder, the gate cutter, the static electricity eliminator, the product inspection machine, etc. also are peripheral equipment directly associated with the body of the injection molding machine or the robot for taking out products, and therefore, they must be positioned with high accuracy as in the case of the robot.

Thus, in the case where the injection molding machine is moved to another location, the positional relationship of the body of the injection molding machine relative to the peripheral equipment which requires highly accurate positioning must be restored to exactly the same as before the transportation, making the positioning work extremely labor-consuming. If the positioning is unsuccessful, it is necessary to perform a teaching operation to the robot and the peripheral equipment again. Also, the peripheral equipment such as the robot may be displaced due to vibration etc. of the body of the injection molding machine. Therefore, in the case of peripheral equipment of this type, a need may arise for assuring the position of the equipment relative to the body of the injection molding machine or for performing the re-teaching operation to the equipment not only at the time of the moving but on a daily basis as routine maintenance.

SUMMARY OF THE INVENTION

An object of the present invention is to provide an injection molding machine capable of easily moving a body of the injection molding machine and peripheral equipment, and eliminating the need for daily work of correcting the position of the peripheral equipment.

An injection molding machine of the present invention comprises: a body of the injection molding machine; and a rest fixed to the body of the injection molding machine and having a mounting portion for mounting thereon peripheral equipment for performing an injection molding operation in cooperation with the body of the injection molding machine.

The rest may be disposed at any desired location insofar as it does not obstruct an operation of the injection molding machine. However, for mounting a robot mechanism for taking out products, it is preferable to provide the mounting portion at a level higher than a mold clamping unit.

BEST MODE OF CARRYING OUT THE INVENTION

Figure 1:
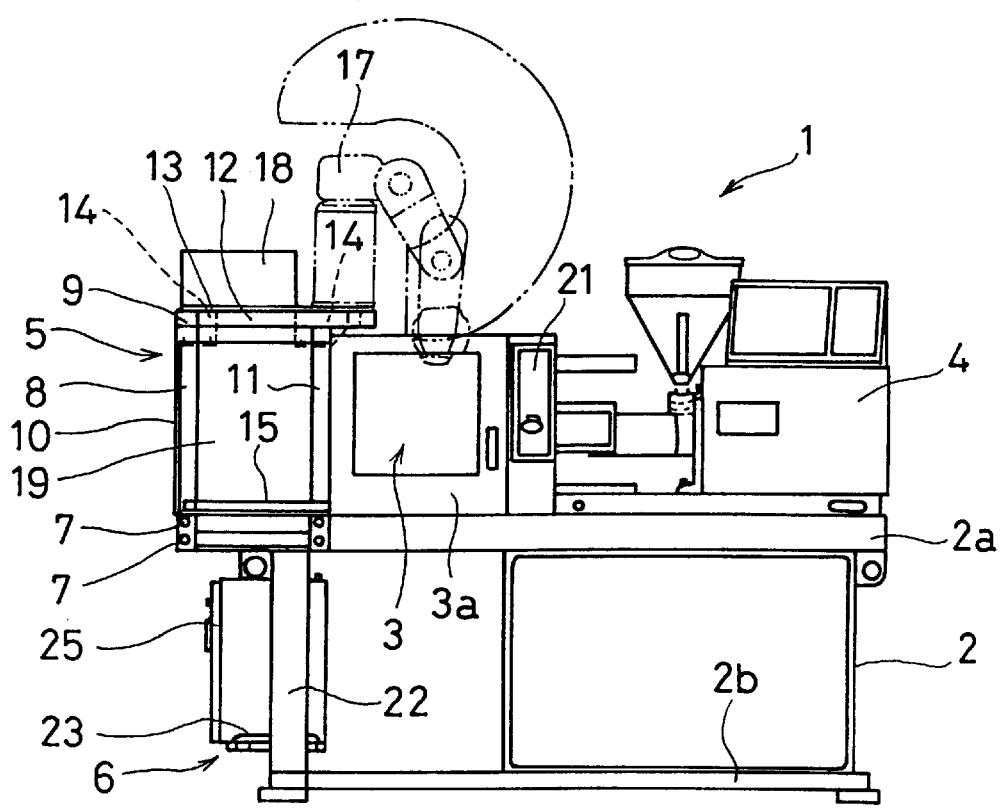
FIG. 1 is a front view of an injection molding machine according to an embodiment of the present invention.
Figure 2:
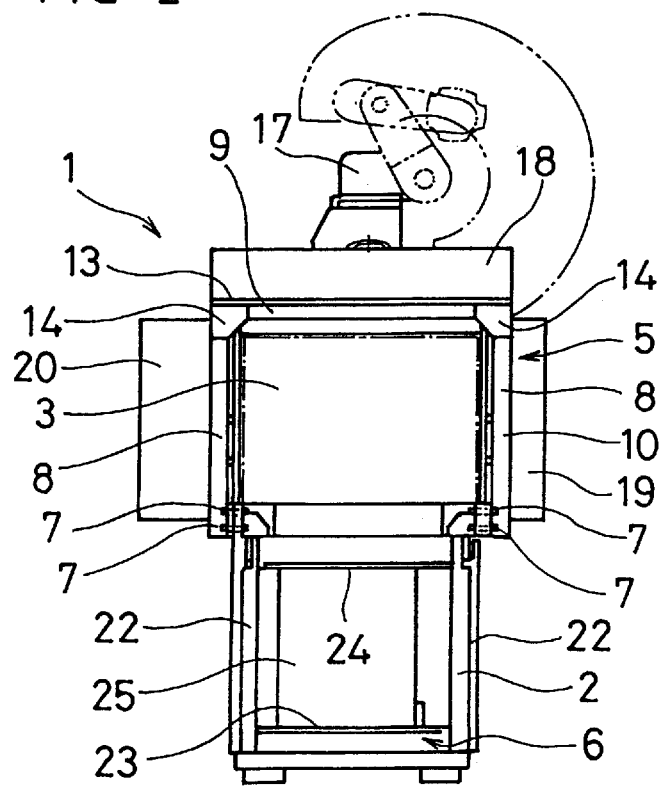
FIG. 2 is a left side view of the injection molding machine.

Referring to FIGS. 1 and 2, an injection molding machine according to an embodiment of the present invention will be described.

A body 1 of the injection molding machine includes a base 2 formed integrally by welding pipe members each having a rectangular cross section, a mold clamping unit 3 and an injection unit 4 mounted on the base 2. A principal part of the base 2 is constituted by two upper rectangular pipes 2a arranged side by side in a direction perpendicular to the paper surface of FIG. 1 and parallel with each other, and two lower rectangular pipes 2b arranged side by side in the direction perpendicular to the paper surface of FIG. 1 and parallel with each other. Columns 22 for supporting the upper rectangular pipes 2a are welded at opposite ends and appropriate portions of the rectangular pipes 2b. In FIGS. 1 and 2, only columns 22 each supporting one end of the rectangular pipe 2a are shown.

The injection molding machine of this embodiment has first and second rests 5 and 6 for mounting peripheral equipment thereon.

The first rest 5 comprises a first U-shaped frame 10, a second U-shaped frame 11, reinforcing pipe members 12, and a peripheral-equipment mounting plate (main mounting portion) 13. The first U-shaped frame 10 includes a pair of upright pipe members 8 secured by bolts 7 to the outer sides of the respective rectangular pipes 2a at a distance from the mold clamping section 3, and a reinforcing pipe member 9 interconnecting the upper ends of the two pipe members 8. The second U-shaped frame 11 has a structure identical with that of the first U-shaped frame 10 and is displaced in the longitudinal direction of the rectangular pipes 2a to such an extent that it does not obstruct a door gate 3a of the mold clamping unit 3. The reinforcing pipe members 12 are provided horizontally for interconnecting the upper end portions on respective sides of the first and second U-shaped frames 10 and 11. The peripheral equipment mounting plate 13 is securely attached to the upper ends of the first and second U-shaped frames 10 and 11, and also to the reinforcing pipe members 12.

A supporting plate (second periperal-equipment mounting plate) 15 projects laterally by being horizontally fixed to the lower ends of the first and second U-shaped frames 10 and 11, to constitute a second peripheral-equipment mounting plate (sub mounting section) 15 in the first rest 5. Although not shown in FIG. 1, a third peripheral-equipment mounting plate (sub mounting section) having a structure identical with that of the second peripheral-equipment mounting plate 15 is provided between the lower ends on the other side of the first and second U-shaped frames 10 and 11, i.e., on the rear side in FIG. 1 (not shown).

The first rest 5 has a structure such that it is fixed by the bolts 7 to the rectangular pipes 2a which constitutes the principal part of the base 2, and thus can be attached to and detached from the injection molding machine 1. Since the U-shaped frames 10 and 11 are each attached to the rectangular pipes 2a by the bolts 7 vertically spaced from each other, and joint portions of the pipe members constituting the rest 5 are securely fixed by the reinforcing plate 14, the framework of the rest 5 does not collapse easily.

In this embodiment, a robot mechanism 17 for taking out products and the other peripheral equipment 18 are mounted on the peripheral-equipment mounting plate (main mounting section) 13 in the first rest 5. In this case, the peripheral equipment 18 may be, for example, a stocker, an insert feeder, a part feeder, a gate cutter, a static electricity eliminator, a product inspection machine or the like which requires to be positioned accurately relative to the mold mounted in the mold clamping unit 3 or relative to the robot mechanism 17 for taking out products. In FIGS. 1 and 2, a range of movement of the robot mechanism 17 for taking out products is indicated by the two-dot-chain lines.

On the second peripheral equipment mounting plate (sub mounting portion) 15, mounted is a peripheral-equipment control panel 19 for operating the robot mechanism 17 for taking out products as well as the other peripheral equipment 18, such as a stocker, insert feeder, part feeder, gate cutter, static electricity eliminator, product inspection machine or the like. Further, on the third peripheral equipment mounting plate (sub mounting section), is a peripheral-equipment controller 20 for controlling the operations of the robot mechanism 17 for taking out products and the other peripheral equipment 18, such as a stocker, insert feeder, part feeder, gate cutter, static electricity eliminator, product inspection machine or the like.

Needless to say, the peripheral equipment control panel 19 may be mounted on the third peripheral-equipment mounting plate (sub mounting section) and the peripheral equipment controller 20 may be mounted on the second peripheral-equipment mounting plate (sub mounting section) 15. In view of the operator's operation efficiency, however, it is preferable that the peripheral equipment control panel 19 is mounted on the second peripheral-equipment mounting plate 15, that is, on the same side as a control panel 21 of the injection molding machine 1.

Mounting of the robot mechanism 17 and the peripheral equipment 18 on the peripheral-equipment mounting plate 13 is usually achieved by means of bolts and nuts. In the case where specifications of the robot mechanism 17, the peripheral equipment 18, the peripheral equipment control panel 19 or the peripheral equipment controller 20 are previously specified by user, the necessary equipment may be mounted with cables and piping connected, prior to shipment from a factory.

After purchasing the injection molding machine 1, a user can mount a robot for taking out products or peripheral equipment of conventional type which has been used by the user, or any peripheral equipment purchased separately, on the mounting plates 13, 15, etc. Since the peripheral equipment mounting plates 13, 15, etc. are securely fixed on the first rest 5 independently of the mechanism of the injection molding machine 1, precision of the injection molding machine 1 is never adversely affected even if these plates 13, 15, etc. are machined by the user.

The second rest 6 comprises upper and lower mounting plates 24 and 23 respectively fixed to upper and lower portions of the columns 22 by bolts etc. to extend between the columns 22. These plates serve as mounting portions in the second rest 6. Plural sets of holes may be provided on the columns 22 at different levels in the vertical direction, to adjust height at which the upper or lower mounting plate 24 or 23 is mounted.

In this embodiment, a controller 25 of the robot 17 for taking out products is mounted on the mounting portion of the second rest 6. As mentioned above, where specifications of the robot controller 25, such as size etc., are previously specified, the controller may be mounted in advance with cables connected, prior to shipment from a factory. It is also possible for a user to mount the robot controller 25 or other peripheral equipment on the mounting portion after purchasing the injection molding machine 1. In such a case, the adjustable height of the upper and lower mounting plates 24 and 23 facilitates the mounting work.

According to the injection molding machine of the present invention, a robot and peripheral equipment to be used in cooperation with the injection molding machine are mounted on mounting portions of the rests which are fixed to the injection molding machine, and therefore, even in moving the injection molding machine to another location, the robot and the peripheral equipment can be transported together with the injection molding machine as one piece, thus making it unnecessary to carry out detachment of the peripheral equipment from the injection molding machine and re-connection of cables and piping, which have been required in moving the conventional injection molding machine.

Further, since the robot is mounted integrally on the injection molding machine, the position of the robot relative to the injection molding machine is not displaced due to vibration etc. caused by molding operation, and even in moving the injection molding machine to another location, complicated work such as readjustment of the relative position of the robot or re-teaching of operation is unnecessary.

What is claimed is:

1. An injection molding machine comprising:
    a body including a clamp unit and an injection unit to perform an injection molding operation, and a base for mounting thereon said mold clamping unit and said injection unit; and
    a first rest affixed to said base separately from said mold clamping unit and said injection unit and having a frame structure for supporting a first peripheral equipment for performing an operation which is associated with the injection molding operation.

2. The injection molding machine according to claim 1, wherein said frame structure supports the first peripheral equipment at a level higher than said mold clamping unit.

3. The injection molding machine according to claim 1, wherein said frame structure supports a robot for taking out products.

4. The injection molding machine according to claim 3, wherein said frame structure supports equipment cooperating with said robot.

5. An injection molding machine, comprising:
    a body to perform an injection molding operation; and
    a first rest affixed to said body and providing a first structural support, said first rest including a first U-shaped frame for mounting thereon a first peripheral equipment for performing an operation which is associated with the injection molding operation; and a second rest affixed to said body and providing a second structural support, said second rest being disposed below said first rest, for mounting thereon a second peripheral equipment for performing an operation which is associated with the injection molding operation.

6. The injection molding machine according to claim 5, wherein said first rest includes a second U-shaped frame for structural support, said injection molding machine comprising:

a first peripheral equipment mounting plate attached to the first U-shaped frame and the second U-shaped frame to provide support for the first peripheral equipment; and a second peripheral equipment mounting plate attached to said second rest to provide support for the second peripheral equipment, wherein the first U-shaped frame provides space beneath said first rest for mounting the second peripheral equipment.

7. The injection molding machine according to claim 6, further comprising:

a third peripheral equipment mounting plate attached to the first U-shaped frame and the second U-shaped frame to provide support for third peripheral equipment.

8. The injection molding machine according to claim 6, wherein the first peripheral equipment is one of the group consisting of a stocker, an insert feeder, a part feeder, a gate cutter, a static electricity eliminator, and a product inspection machine.

9. The injection molding machine according to claim 8, wherein the second peripheral equipment is a control panel electrically connected to the first peripheral equipment for providing control.

10. The injection molding machine according to claim 5, wherein said body has a mold clamping unit, and said first rest is disposed at a level higher than said mold clamping unit.

11. The injection molding machine according to claim 5, wherein a robot for taking out products is mounted on the first U-shaped frame.

12. The injection molding machine according to claim 11, wherein equipment cooperating with said robot is mountable on said second rest.

13. The injection molding machine according to claim 5, said body further comprises:

upper and lower support members which are joined in parallel fashion by a plurality of supper column members, wherein the first U-shaped frame is connected to the upper support member by a plurality of bolts, such that the first U-shaped frame is removably attached.

14. The injection molding machine according to claim 5, further comprising:

a third rest affixed to said body and providing a third structural support, said second rest being disposed below said first rest for mounting thereon a third peripheral equipment for performing an operation which is associated with the injection molding operation.

15. An injection molding machine, comprising:

a body to perform an injection molding operation;

a first rest affixed to said body and providing a first structural support, said first rest including a first U-shaped frame for mounting thereon a first peripheral equipment for performing an operation which is associated with the injection molding operation;

a second rest affixed to said body and providing a second structural support, said second rest including a second U-shaped frame and being disposed below said first rest for mounting thereon a second peripheral equipment for performing an operation which is associated with the injection molding operation;

a first peripheral equipment mounting plate attached to the first U-shaped frame and the second U-shaped frame to provide support for the first peripheral equipment;

a second peripheral equipment mounting plate attached to said second rest to provide support for the second peripheral equipment; and a third peripheral equipment mounting plate attached to the first U-shaped frame and the second U-shaped frame to provide support for third peripheral equipment, wherein the first U-shaped frame provides space beneath said first rest for mounting the second peripheral equipment.

16. The injection molding machine according to claim 15, wherein the first peripheral equipment is one of the group consisting of a stocker, an insert feeder, a part feeder, a gate cutter, a static electricity eliminator, and a product inspection machine.

17. The injection molding machine according to claim 15, wherein said body has a mold clamping unit, and said first rest is disposed at a level higher than said mold clamping unit.

18. The injection molding machine according to claim 15, wherein a robot for taking out products is mounted on the first U-shaped frame.

19. The injection molding machine according to claim 15, wherein equipment cooperating with said robot is mountable on said second rest.

20. The injection molding machine according to claim 15, said body further comprises:

upper and lower support members which are joined in parallel fashion by a plurality of supper column members, wherein the first U-shaped frame is connected to the upper support member by a plurality of bolts, such that the first and second U-shaped frames are removably attached.

21. The injection molding machine according to claim 1, further comprising a second rest to provide structural support for a second peripheral equipment, said second rest being attached to said base below said first rest.

22. An injection molding machine, comprising:

a body to perform an injection molding operation; and a first rest affixed to said body and providing a structural support, said first rest including a U-shaped frame to mount thereon a first peripheral equipment for performing an operation which is associated with the injection molding operation, such that a second rest to provide structural support for second peripheral equipment may be attached to said body below said first rest.

23. An injection molding machine comprising:

a body to perform an injection molding operation; and a fixed rest affixed to said body and providing structural support, said first rest including a U-shaped frame for mounting thereon a first peripheral equipment for performing an operation which is associated with the injection molding operation.

* * * * *